United States Patent Office 3,287,319
Patented Nov. 22, 1966

3,287,319
COMPLEX POLYESTERS OF POLYCARBOXYLIC ACIDS WITH HYDROXYL COMPOUNDS AND METADIOXANES
Moïse Lerer, Paris, France, assignor to Institut Francais du Petrole, des Carburants et Lubrifiants, Rueil-Malmaison, France
No Drawing. Filed Apr. 23, 1963, Ser. No. 274,915
Claims priority, application France, Apr. 25, 1962, 895,630
7 Claims. (Cl. 260—75)

This invention relates to new complex esters obtained by reacting polycarboxylic acids or functional derivatives thereof with metadioxanes and hydroxy compounds.

The resulting new esters exist in the form of either viscous liquids or of solid resins, according to their degree of condensation.

It is an object of this invention to provide new esters exhibiting drying oil properties.

It is another object of this invention to provide new esters which may be used as basic components for paints or varnishes either as such or in admixture with other conventional components for paints or varnishes.

It is yet another object of this invention to provide new esters which may be used as adhesive materials.

It is still another object of this invention to provide new esters which may be used as adhesive and coating materials in the manufacture of laminated products.

It is a further object of this invention to provide thermosetting and thermoplastic resins which have the same use as the conventional resins of the polyester type by polymerization of the novel esters of this invention, or copolymerization of the same with other polymerizable monomers such as styrene, allyl orthophthalate or terephthalate, and the like.

It is still a further object of this invention to provide plasticizers and starting materials for the manufacture of paints or varnishes by heat treatment of the novel complex esters derived from unsaturated acids with drying oils such as linseed oil or chinese wood oil.

All of these and other objects as may be apparent from the following specification and claims are achieved by means of the new esters according to this invention, obtained as the reaction product of metadioxanes and hydroxy compounds with polycarboxylic acids or their functional derivatives.

By metadioxanes as defined in this invention, there are included not only the metadioxanes themselves, but also the substituted derivatives thereof, wherein the substitutes may be comprised of, for instance, either hydrocarbon radicals which may in turn be substituted by functional groups, or simply the functional groups themselves.

By way of non-limitative examples, there may be used metadioxanes resulting from the condensation of simple olefins, containing for instance, from 3 to 20 carbon atoms, with formaldehyde or polymers thereof. However, the preferred metadioxanes are 4-methylmetadioxane, 4,4-dimethylmetadioxane and 4,5-dimethylmetadioxane.

It must be understood, moreover, that this invention is not intended to be limited to the use of the preferred metadioxanes as hereinabove mentioned since it is also applicable to metadioxanic alcohols such as, for instance, 4-methyl-4-(2'-hydroxyethyl) metadioxane, as well as to polycyclic compounds containing at least one ring of the metadioxanic type in their molecule.

Metadioxanes particularly suitable for the purpose of manufacturing the new esters according to this invention are those having the following general formula:

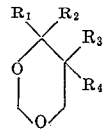

wherein $R_1$, $R_2$, $R_3$, and $R_4$ are identical or different radicals from the group comprising hydrogen or alkyl containing 1 to 18 carbon atoms inclusive, and hydroxyalkyl containing 1 to 18 carbon atoms and 1 to 3 hydroxy groups, preferably only one hydroxy group.

The acids used are of the polycarboxylic type. They may be saturated or ethylenically unsaturated and contain, for instance, from 2 to 20 carbon atoms, 0 to 3 carbon to carbon double bonds, and 2 to 4 carboxyl groups in their molecule. As saturated acids there may be used, for instance, glutaric acid, succinic acid, adipic acid, a phthalic acid, and an eicosanedioic acid. As ethylenically unsaturated acids, there may be used, for instance, maleic acid, fumaric acid, hexendioic acids, dodecendioic acids and octadecendioic acids.

Irrespective of their type, they may be either acyclic or cyclic, which is the case of colophony and the acids contained therein. There may also be used a mixture of several different acids.

By functional derivative of a carboxylic acid there is meant any known carbonylic or carboxylic compound capable of replacing the above mentioned acids in an esterification reaction, such as, for instance, acid anhydrides, acid halides, esters, amides, imides, and the like, the preceding list being not limitative of the scope of the invention. It is, however, preferred to make use of an acid anhydride.

Still further specific examples of the polycarboxylic acids and their functional derivatives are as follows:

orthophthalic anhydride
isophathalic acid
terephthalic acid
suberic acid
sebacic acid
citric acid
tartaric acid, and
benzenetricarboxylic acids.

The hydroxy compounds may be selected preferably from the group comprising monohydric and polyhydric alcohols, ethers of polyhydric alcohols having at least one free hydroxy group, and mixtures thereof, and as specific examples, for instance, from the group comprising ethanol, butanol, "oxo" alcohols, such as $C_8$ oxo alcohol, dodecanol, octadecanol, ethylene glycol, polyglycols such as diethylene glycol, diethylene gycol monoethyl ether, glycerine, pentaerythritol and their homologs, and substituted derivatives thereof. There may also be used hydroxy acids such as citric acid and tartaric acid.

In general, the hydroxy compound can be any organic compound such as aliphatic, aryl, alicyclic, aralkyl, and the like, which contains 1-20, preferably 2-10 carbon atoms, and 1-5, preferably 2-3 hydroxy groups.

The hydroxy compounds are added to the metadioxane and to the acid at the beginning, or preferably during the course of, the reaction therebetween (for instance, half an hour or more after the beginning of the reaction). The amount of hydroxy compound is so selected as to be equal, or to slightly exceed the amount necessary for the production of esters of relatively low acid index, for instance lower than 80, taking into account the acid index of the reaction mixture. For example, if the reaction mixture of a polycarboxylic acid with a metadioxane exhibits an acid index of 280 (which means that 280 mg. or 0.005 equivalent of KOH are required for neutralizing 1 g. of the mixture), there will be added at least 0.005 OH equivalent of a mono- or polyhydric alcohol, for example from 0.155 to 0.170 g. of ethyleneglycol per gram of the reaction mixture.

The preferred proportions of the reactants are one acid equivalent to 0.25–3 metadioxanic equivalents and 0.1–2 OH equivalents of monohydric or polyhydric alcohols (a metadioxane ring corresponding to 2 metadioxanic equivalents). However, within these ranges, the sum of the equivalents (metadioxanic and OH equivalents) must be at least equal to the number of acid equivalents and will be preferably of 1.25 to 2 times the latter.

The esterification of metadioxanes by means of carboxylic acids or functional derivatives thereof, in the presence of hydroxylated compounds may be conducted in a conventional manner. It will, for example, be conducted by contacting the reactants optionally in the presence of an added small amount of a conventional esterification catalyst and/or of an inert solvent at a temperature so selected as to provide for a satisfactory reaction velocity.

As a conventional esterification catalyst there may be used, for instance, a mineral or organic acid, a metallic oxide or hydroxide, an acid-acting salt, a dehydrating agent or the like, specific examples being, for instance, alumina, litharge, mercuric sulfate, aluminum sulfate, zinc chloride, potassium bisulfate, sodium dihydrogen phosphate, boric acid and the like.

The reaction temperature will depend on the reactivity of the reactants, in particular on the reactivity of the acid or its functional derivatives. Thus, by way of example, the carboxylic acids will be advantageously reacted at a temperature in the range of from 100 to 300° C., whereas the acid halides may be used at the ambient or even a lower temperature. When using acid anhydrides, the preferred temperature will be, for instance, comprised between 120 and 250° C.

The order in which the reactants react can be varied. For example, the metadioxane, carboxylic acid and hydroxyl compound can be added to the reaction vessel simultaneously at the beginning of the reaction. It is preferred, however, that the metadioxane and carboxylic acid be first reacted so as to convert at least 20% of said acid and that the hydroxy compound be added subsequently.

The volatile compounds which may be liberated during the course of the reaction, particularly formaldehyde and water, generally escape, at least partly, from the reaction mixture. This removal may be enhanced by means of azeotrope formation, for instance with the metadioxane when the latter is sufficiently volatile. It may also be facilitated by carrying over the formed volatile products with an added compound forming therewith azeotropic mixtures or with an inert gas.

The degree of completion of the reaction may be deduced from the values of physical characteristics of the reaction mixture such as its viscosity, its density or its refraction index or from chemical tests consisting, for instance, of periodic determinations of the acidity of the mixture.

After separation of the volatile products formed during the reaction, the remaining reaction product of liquid or resin consists, at least partly, of the esters of this invention. This reaction product may be used as such or after conventional treatments of washing, neutralization with basic substances, decoloration, distillation of the unconverted reactants or any other convenient treatment applicable to the intended use of the esters. By use of monohydric alcohols under the above-stated conditions, there are obtained products of a low degree of condensation, and consequently, of low viscosity which are more generally suitable for use as plasticizers.

It has been observed that the complex esters obtained according to this invention offer various advantages as compared to the simple esters resulting from the reaction of carboxylic acid with metadioxanes alone, and particularly the advantages of a lower acidity and of obtaining, by the reaction of unsaturated acids or their functional derivatives, esters whose copolymerization with styrene or other polymerizable monomers results in products which are harder, less brittle and more resistant to heat than the above-mentioned simple esters.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

*Example 1*

This experiment is carried out into a reaction vessel provided with a thermometer, mechanical stirring means, an inlet pipe for introducing gas thereinto, a dropping funnel and surmounted with a separator providing for the back flow into the reaction vessel of the upper distilled phase.

Into this reaction vessel are introduced 98 g. of maleic anhydride and 1 g. of activated alumina while the contents are heated up to 180° C.

There are subsequently added during the course of 2½ hours while stirring and causing a mild stream of inert gas (nitrogen or $CO_2$) to pass through the reaction vessel, 232 g. of 4,4-dimethylmetadioxane, the temperature of the reaction mixture being maintained at about 190° C. The heating is continued for 6 more hours at substantially the same temperature and the reaction product is concentrated under a reduced pressure of 20 mm. of mercury at a temperature of 150° C. There is thereby obtained a very acidic resin (acid index of 200, which means that 200 mg. of potash are required for neutralizing 1 g. of the resin).

*Example 2*

Into the same reaction vessel as described in Example 1, there are introduced 98 g. of maleic anhydride and 1 g. of activated alumina while heating up to 180° C. At this temperature there are further introduced 116 g. of 4,4-dimethylmetadioxane, progressively in 2½ hours, and the heating is continued thereafter for 30 minutes. The acid index of the reaction mixture is then determined to be 327. There are subsequently added 60 g. of diethylene glycol while still heating at a temperature of about 190° C. for 5½ hours more and the resulting reaction mixture is concentrated under a reduced pressure of 20 mm. of mercury at a temperature of 150° C. so as to remove the volatile products therefrom. There are thus obtained 226 g. of a resin having an acid index of 60.

*Example 3*

Example 2 is repeated except that the diethylene glycol is replaced by an equal amount of dipropylene glycol. There are thus obtained 222 g. of a resin having an acid index of 65.

*Example 4*

There is heated for 2 hours, at a temperature of 150° C., a mixture of 60 g. of maleic anhydride with 100 g. of 4-methyl-4-(2'-hydroxyethyl) metadioxane and 1 g. of activated alumina. 50 g. of diethylene glycol are thereafter introduced thereinto and the resulting mixture is progressively heated for 4 hours up to a temperature of 190° C., the volatile products being allowed to distill in a first step under atmospheric pressure and in a second step under a progressively reduced pressure down to 50 mm. of mercury. There are so obtained 170 g. of a resin having an acid index equal to 79.

*Example 5*

Into the reaction vessel described in Example 1 there are introduced 98 g. of maleic anhydride and 1 g. of mercuric sulfate, and the resulting mixture is heated to 180° C. At this temperature are thereafter introduced 116 g. of 4,4-dimethylmetadioxane while maintaining the heating for the next 70 minutes. At this stage, the reaction mixture exhibits an acid index of 347. There are subsequently added thereto 50 g. of glycerine while heating up for 2½ hours at a temperature of 200–215° C. After concentration of the resulting mixture under a reduced pressure of 50 mm. of mercury, there are obtained 220 g. of a resin having an acid index of 60.

*Examples 6–10*

10 g. of the resin produced according to each of the preceding examples are admixed with 5 g. of styrene, 0.05 g. of the peroxide methyl ethyl ketone, and 0.05 g. of cobalt octanoate having a 6% cobalt content.

In each case the resulting reaction product is progressively converted into an infusible, hard resin which is nevertheless resistant to impact. This conversion may be accelerated by heating.

The ratio of ester to styrene may be varied from 10 parts ester to 2–50 parts by weight styrene. Furthermore, instead of styrene, other α-ethylenically unsaturated monomers may be employed such as diallyl orthophthalate, dialkyl terephthalate, isoprene and butadiene.

*Example 11*

Into the reaction vessel described in Example 1 are introduced 98 g. of maleic anhydride and 1 g. of activated alumina and the resulting mixture is heated to 180° C. At this temperature there are further introduced 116 g. of 4,4-dimethylmetadioxane in 1 hour and thereafter, progressively, 130 g. of normal amyl alcohol in 9 hours at a temperature of 200° C. There are thus obtained 270 g. of a viscous liquid having an acid index of 40.

*Example 12*

Into the reaction vessel described in Example 1 are introduced 148 g. of orthophthalic anhydride, 116 g. of 4,4-dimethylmetadioxane and 2.6 g. of formic acid acting as catalyst. The resulting mixture is heated up for 2½ hours at a temperature of 150° C. There are then added thereto 163 g. of diethylene glycol while heating to 180° C. for 7 more hours. After concentration under a reduced pressure of 20 mm. of mercury, the temperature in the reaction vessel being maintained at 170° C., there are obtained 324 g. of a resin having an acid index of 73.

*Example 13*

A typical composition of paint employing the esters of this invention is as follows:

|  | Grams |
|---|---|
| Resin described in Example 2 | 50 |
| Diethyleneglycolmonoethylether | 50 |
| Cobalt naphthenate | 3 |
| Titanium dioxide | 30 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed as this invention is:

1. A process for manufacturing complex esters comprising the step of reacting (a) a member of the group consisting of polycarboxylic acids containing from 2 to 20 carbon atoms, 0 to 3 carbon to carbon double bonds and 2 to 4 carboxyl groups in their molecule and the anhydrides and esters thereof, with (b) a metadioxane of the formula

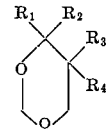

wherein one of the $R_1$, $R_2$, $R_3$, and $R_4$ radicals is selected from the group consisting of hydrogen, alkyl radicals of 1–18 carbon atoms and monohydroxyalkyl radicals of 1–18 carbon atoms, and the others are selected from the group consisting of hydrogen and alkyl radicals of 1–18 carbon atoms, and (c) a polyhydric alcohol containing 2–20 carbon atoms and 2–5 hydroxy groups per molecule, wherein for each acid equivalent of compound (a), there is used 0.25 to 3 metadioxanic equivalents of compound (b) and 0.1 to 2 OH alcoholic equivalents of compound (c) the sum of the metadioxanic and OH equivalents being equal to at least 1.

2. A process for manufacturing complex esters comprising the step of reacting (a) a member of the group consisting of polycarboxylic acids containing from 2 to 20 carbon atoms, 0 to 3 carbon to carbon double bonds and 2 to 4 carboxyl groups in their molecule and the anhydrides and esters thereof, with (b) 4,4-dimethylmetadioxane and (c) a polyhydric alcohol containing 2–10 carbon atoms and 2–3 hydroxy groups per molecule, wherein for each acid equivalent of compound (a) there is used 0.25 to 3 metadioxanic equivalents of compound (b) and 0.1 to 2 OH alcoholic equivalents of compound (c) the sum of the metadioxanic and OH equivalents being at least equal to 1.

3. A process for manufacturing complex esters comprising the step of reacting (a) maleic anhydride with (b) 4,4-dimethylmetadioxane and (c) a polyhydric alcohol containing 2–10 carbon atoms and 2–3 hydroxy groups per molecule, wherein for each acid equivalent of compound (a), there is used 0.25 to 3 metadioxanic equivalents of compound (b) and 0.1 to 2 OH alcoholic equivalents of compound (c), the sum of the metadioxanic and OH equivalents being equal to at least 1.

4. A process for manufacturing complex esters comprising the step of reacting (a) maleic anhydride with (b) 4,4-dimethylmetadioxane and (c) diethylene glycol, wherein for each acid equivalent of compound (a), there is used 0.25 to 3 metadioxanic equivalents of compound (b) and 0.1 to 2 OH alcoholic equivalents of compound (c), the sum of the metadioxanic and OH equivalents being equal to at least 1.

5. A process for manufacturing complex esters comprising the step of reacting (a) maleic anhydride with (b) 4-methyl-4-(2-hydroxyethyl) metadioxane and (c) a polyhydric alcohol containing 2–10 carbon atoms and 2–3 hydroxy groups per molecule, wherein for each acid equivalent of compound (a) is used 0.25 to 3 metadioxanic equivalents of compound (b) and 0.1 to 2 OH alcoholic equivalents of compound (c), the sum of the metadioxanic and OH equivalents being equal to at least 1.

6. The process of claim 1 wherein the hydroxy compound is reacted with the other two reactants only after the latter two have reacted with each other for at least ½ hour.

7. A process for the manufacture of complex esters which process comprises reacting in parts by weight about 98 parts of maleic anhydride in contact with about 1 part of activated alumina with about 116 parts of 4,4-dimethylmetadioxane at 100–300° C., and after the reaction has continued for at least ½ hour, adding about 60 parts of diethylene glycol and continuing the reaction for a sufficient time to obtain a resinous ester.

References Cited by the Examiner
UNITED STATES PATENTS

| | | | |
|---|---|---|---|
| 2,385,661 | 9/1945 | Vaala | 260—340.7 |
| 3,015,665 | 1/1962 | Wollner | 260—75 |
| 3,020,263 | 2/1962 | Foster | 260—75 |
| 3,164,569 | 1/1965 | Ide et al. | 260—75 |

SAMUEL H. BLECH, *Primary Examiner.*

WILLIAM H. SHORT, *Examiner.*

R. LYON, *Assistant Examiner.*